J. E. MONTGOMERY.
WHEEL RIM.
APPLICATION FILED APR. 24, 1917.
1,253,866.
Patented Jan. 15, 1918.
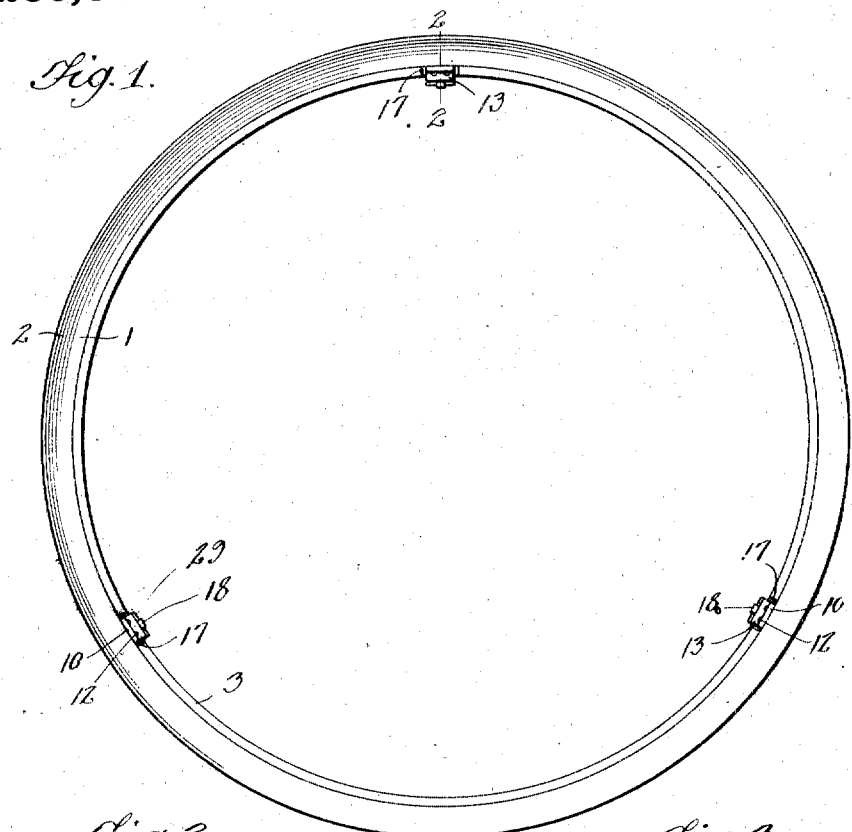
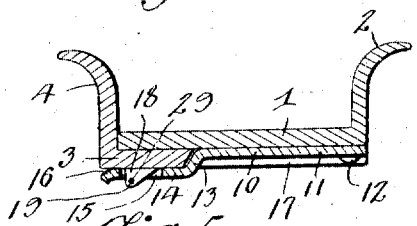
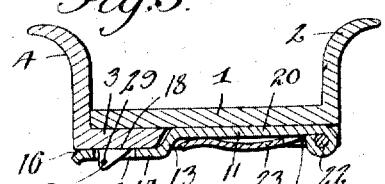
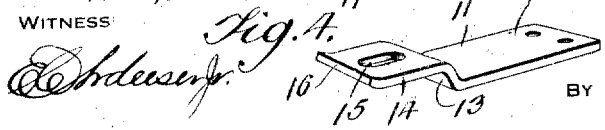
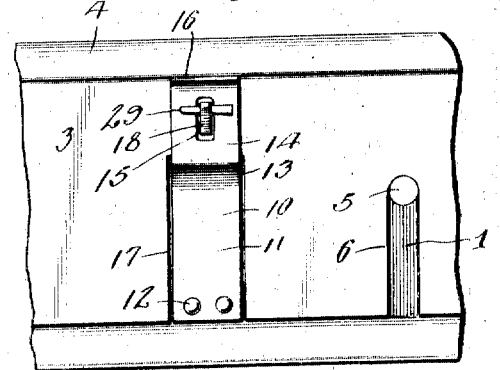
INVENTOR
J. E. Montgomery,
BY Victor J. Evans
ATTORNEY
WITNESS

UNITED STATES PATENT OFFICE.

JAMES E. MONTGOMERY, OF LANCASTER, KENTUCKY, ASSIGNOR OF ONE-THIRD TO WILLIAM JENNINGS, OF LANCASTER, KENTUCKY.

WHEEL-RIM.

1,253,866.      Specification of Letters Patent.      Patented Jan. 15, 1918.

Application filed April 24, 1917. Serial No. 164,220.

*To all whom it may concern:*

Be it known that I, JAMES E. MONTGOMERY, a citizen of the United States, residing at Lancaster, in the county of Garrard and State of Kentucky, have invented new and useful Improvements in Wheel-Rims, of which the following is a specification.

This invention relates to carriages and wagons, and more especially to wheels; and the object of the same is to produce an improved sheet metal rim for a wheel adapted to receive a resilient tire, such as the casing of an ordinary pneumatic tire.

Essentially the rim is made in two telescopic sheet metal members, each having a flange to engage the side of or take over the bead along the casing of the tire, with means for connecting the base portion or bands of these members where they overlie each other. Details are set forth in the following specification, and reference is made to the accompanying drawings wherein:

Figure 1 is a side elevation of this complete rim ready for attachment to the felly of any ordinary wheel, but more especially intended to be mounted on an automobile wheel, although I do not wish to be limited in this respect.

Fig. 2 is an enlarged cross section on the line 2—2 of Fig. 1.

Fig. 3 is an enlarged plan view taken from the inner side of Fig. 1, and Fig. 4 is a perspective detail of the latch.

Fig. 5 is a sectional detail much like Fig. 2, illustrating a slight modification.

This improved rim is made of two telescopic and complementary parts. The radially outer part comprises a flat member or band 1 having an outturned flange 2 at one edge, and the radially inner part comprises a flat member or band 3 slightly smaller circumferentially than the outer member 1 and capable of being slipped into it, and an outstanding flange 4 along the free edge which will eventually stand opposite the edge carrying the flange 2. In other words, when the two members or bands are engaged by telescoping the smaller numbered 3 into the larger numbered 1 as seen in Fig. 2, the outer member extends across the base of the tire casing and the flanges 4 and 2 project radially outward alongside the tire which is not necessary to illustrate. These flanges may turn outward from each other at their outer edges so as to engage flat-sided tires, or they may hook inward to engage over beads on tires or tire casings, according as the latter are made, and I reserve the broadest latitude in this respect. As each part is made of sheet metal, the flange can be rolled or otherwise formed integral with the flat band or member, all at one operation. Said bands or members are of equal width as seen in the sectional views, and therefore when they are assembled the outer member wholly underlies the base of the tire casing so as to leave no cracks which might pinch the tube, and the inner member wholly underlies the outer member so as to reinforce it throughout its full width, and thereby permit both parts to be made of lighter material than would otherwise be the case. The free or unflanged edge of the outer member forms in effect a shoulder where it comes squarely into contact with the inner face of the flange of the inner member at a time when the free edge of the latter is coincident with the flanged edge of the outer member. At an appropriate point the outer member 1 is provided with a hole 5 through which is to project the nipple of the air tube within the tire, and at a corresponding point the inner member is provided with a transverse slot 6 leading from one edge of the member inward so that its inner end overlies the hole as seen in Fig. 3; and therefore when the parts are applied as described below, the nipple will project through the hole and the inner end of the slot as will be clearly understood without further illustration.

At several points around the rim, and at three points as seen in Fig. 1 although I may employ these devices at a larger number of points, I provide latches 10 as seen in Fig. 4. Each has a relatively straight spring body 11 attached at one end by suitable means such as rivets 12 to the outer member 1 adjacent its flange 2 as seen in Fig. 2, and the remote end of the body is bent inward in a shoulder 13, thence continued into a lip 14 provided with a longitudinal slot 15, and the tip 16 of the lip is preferably upturned as seen. To accommodate these several latches when the two members are slipped together as described below, the inner member is provided at corresponding points with recesses 17, each of a width to loosely inclose the body 11 and of a depth to receive the body up to the shoulder 13. Directly opposite the inner or closed end of the recess, the inner member carries a catch 18, which, as seen in Fig. 2, is beveled on that face adjacent the recess and abrupt on its other or outer face, and through the tip or nose of this catch may be formed a perforation as indicated at 19 in Fig. 2. As suggested above, the body of the latch 10 shown in Fig. 4 is preferably resilient so that it normally occupies the position seen in Fig. 2.

In a slightly modified form of my invention shown in Fig. 5, the catch 20 instead of being riveted at 12 to the inner member is pivoted at 22 thereto, and a leaf spring 23 is employed having one end mounted fast on or secured to the pivot pin and the other end bearing against the body of the latch so as to press its lip toward the catch, the same as though it sprung toward the catch by the resiliency of the body in the type illustrated in Fig. 2. In all other respects the modified form shown in Fig. 5 is essentially the same as the form first described.

With this construction, the operation of my device is as follows: When a tire is to be placed on this rim, we will assume that the two parts thereof are separated. The casing, containing its tube, is now slipped around the outer member 1 and against its flange 2, and the flange and the side of the casing are turned down and laid upon the ground. The inner member 3 is now brought into position and slipped into the outer member, care being taken that the several recesses 17 exactly register with the lips 14 at the free ends of the several latches. This will be necessary because at this time the slot 6 in the inner member must of course register with the nipple which projects through the hole 5 in the outer member, the parts having thus been assembled. When now the inner member is borne downward, the beveled faces of the several catches 18 travel over the outturned tips 16 of the several latches, so that the latter are sprung if they are riveted at 12 or deflected if they are pivoted at 22, and eventually the catches 18 snap into the slots 15 in the lips 14 just at a time when the flange 4 comes up against the now upper edge of the outer member 1, which it does when the inner edges of the casing are pressed together to their proper extent. The rim is now placed on the felly and secured thereon by means forming no part of the present invention, and either before or after this step the air tube may be inflated as usual. I might say that for the sake of greater security I have shown in Fig. 3 how a pin 29 might be passed through each of the perforations 19 to prevent the possibility that any latch may become disconnected from its catch. This pin could be a piece of wire, and if used the operator must remove the pin before he attempts to disconnect the two parts of this improved rim. I do not wish to be limited to the materials, proportions or exact details of parts, other than as hereinbefore set forth.

What is claimed as new is:—

1. The herein described rim comprising an annular sheet metal member adapted to extend across the base of a tire casing, a radial flange at one edge of said member, a second sheet metal annular member of equal width with but slightly smaller than the first and adapted to fit telescopically into the same, a radial flange at one edge of the second member adapted to abut against the free edge of the first, the inner member having at appropriate points transverse recesses extending from its free edge inward, a catch on the inner face of this member opposite the inner end of each recess, and latches secured at corresponding points to the inner face of the outer member adjacent its flanged edge with their bodies adapted to lie in said recesses and their free ends deflected into lips, each of the latter having a slot for engaging a catch.

2. The herein described rim comprising two complementary parts of sheet metal respectively including flat annular members of slightly different size so that one will pass into the other but of equal width so that the outer will wholly overlie the inner when they are assembled, and an outstanding flange at one edge of each member, the inner member having transverse recesses at intervals, inwardly extending catches on this member opposite its recesses, each catch having a transverse perforation, latches attached at one end to the inner face of the outer member at intervals corresponding with said recesses with their bodies adapted to lie therein when the parts are assembled and their other ends deflected into lips, each having a slot for the reception of one of said catches, and removable fastening devices through the perforations in the latter.

In testimony whereof I affix my signature.

JAMES E. MONTGOMERY.